(12) United States Patent
Nakamura et al.

(10) Patent No.: US 6,513,722 B1
(45) Date of Patent: Feb. 4, 2003

(54) CARTRIDGE AND MEMORY MEDIUM COMPRISING CARTRIDGE AND PLATE MEMORY

(75) Inventors: Yoshihide Nakamura, Tokyo (JP); Norio Shindo, Tokyo (JP); Norifumi Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/806,556

(22) PCT Filed: Jul. 31, 1999

(86) PCT No.: PCT/JP00/05149
§ 371 (c)(1),
(2), (4) Date: Mar. 30, 2001

(87) PCT Pub. No.: WO01/09826
PCT Pub. Date: Feb. 8, 2001

(30) Foreign Application Priority Data

Aug. 2, 1999 (JP) ............................................. 11-219272

(51) Int. Cl.$^7$ ............................................... G06K 19/08
(52) U.S. Cl. ........................................ 235/492; 492/487
(58) Field of Search ................................ 235/492, 493, 235/487, 441, 444, 449, 451

(56) References Cited

U.S. PATENT DOCUMENTS

| | | | | |
|---|---|---|---|---|
| 4,891,727 A | * | 1/1990 | Sato et al. | 235/440 |
| 4,959,744 A | * | 9/1990 | Kamazawa | 360/133 |
| 5,584,043 A | | 12/1996 | Burkart | 395/882 |
| 5,966,268 A | * | 10/1999 | Nicklos | 360/99.06 |
| 6,193,162 B1 | * | 2/2001 | Niwata et al. | 235/487 |
| 6,295,564 B1 | * | 9/2001 | Shigetomi et al. | 235/492 |

FOREIGN PATENT DOCUMENTS

| | | | | |
|---|---|---|---|---|
| JP | 10-154180 | * | 6/1998 | G06K/19/06 |
| JP | 10-334630 | * | 12/1998 | G06K/19/06 |
| JP | 11-25247 | * | 1/1999 | G06K/19/77 |

* cited by examiner

*Primary Examiner*—Thien M. Le
*Assistant Examiner*—Daniel St.Cyr
(74) *Attorney, Agent, or Firm*—Jay H. Maioli (57) ABSTRACT

A rectangular cartridge that is substantially common in shape and external size with a disc cartridge in which a flexible magnetic disc with a diameter of 3.5 inches is accommodated, wherein at one side of the cartridge there is formed an insertion hole which permits insertion of a substantially rectangular plate-shaped memory and is adapted so that the plate-shaped memory is inserted with the short side as the insertion side. Further, there is formed a memory attaching portion substantially in correspondence with a long side of the plate-shaped memory in a manner continuous to the memory insertion hole and in parallel to the side adjacent to the side where the memory insertion hole is formed. In addition, a group of terminals for connection to terminals of the plate-shaped memory are provided at the terminating portion of the memory attaching portion. The cartridge is intended to be loaded into a recording and/or reproducing apparatus in the state where the plate-shaped memory is attached to the memory attaching portion. Thus, recording and/or reproduction of information signals with respect to the plate-shaped memory are carried out.

24 Claims, 5 Drawing Sheets

CARTRIDGE AND MEMORY MEDIUM COMPRISING CARTRIDGE AND PLATE MEMORY

TECHNICAL FIELD

This invention relates to a cartridge used for fitting (attaching) plate-shaped memory having memory element at a memory fitting portion to fit (attach) it with respect to a recording and/or reproducing apparatus to thereby carry out recording and/or reproduction of information signals with respect to the plate-shaped memory by this recording and/or reproducing apparatus, and a memory medium comprising such a cartridge and a plate-shaped memory.

BACKGROUND ART

Hitherto, as information recording medium of a drive unit included within a personal computer or an audio visual equipment and used as an information memory unit, or a drive unit used as an external memory unit of the equipment, there have been widely used disc cartridges within which flexible magnetic disc having diameter caused to be 3.5 inches is accommodated.

Since the disc cartridges within which flexible magnetic disc having diameter caused to be 3.5 inches is accommodated are excellent in wide use characteristic and compatibility as information recording medium, they have been widely used as a recording medium of a drive unit for carrying out recording and/or reproduction of various information such as not only data processed in the computer but also audio information or video information, etc.

Moreover, plate-shaped memories comprising solid-state memory, e.g., integrated circuit or flash memory, etc. and caused to become more compact are proposed as recording media such as personal computer or audio visual equipment, etc. Such recording media are attached at various electronic equipments, e.g., video camera, etc. and are adapted so that data such as video data and/or audio data, etc. are recorded.

Since plate-shaped memories using solid-state memory of this kind can be formed to be small as compared to disc cartridges within which flexible magnetic disc caused to have diameter of 3.5 inches is accommodated, such plate-shaped memories are suitable as recording medium of video camera used in portable manner and/or portable personal computer.

Since small recording media constituted as the above-described plate-shaped memory cannot carry out recording/reproduction of information signals if corresponding equipment is dedicated electronic equipment provided with recording/reproducing unit corresponding to such small recording medium, there is lack in wide use characteristic. In view of the above, there are proposed recording media in which the above-described small recording medium is fitted (attached) in cartridge caused to be substantially common in shape and external size (dimension) of disc cartridge within which flexible magnetic disc caused to have diameter of 3.5 inches is accommodated and of synthetic resin called upper half and lower half.

Meanwhile, as small recording media as plate-shaped memory fitted (attached) to the cartridge, various recording media have been proposed until now, but shapes and outer size (dimensions) are respectively different. For example, there is known a packaged plate-shaped memory in which one side is caused to be 37 mm, the other side is caused to be 45 mm and the thickness is caused to be 0.76 mm. Since such plate-shaped memory has thin thickness, sufficient strength cannot be obtained. For the purpose of preventing damage, it is necessary to pay attention to attachment/detachment with respect to the cartridge. As a result, handling is inconvenient. In addition, since the entirety of the plate-shaped memory is small and thin, there is the possibility that it may be missing in carrying and/or there is the possibility that it may be broken.

DISCLOSURE OF THE INVENTION

In view of the above, an object of this invention is to provide a novel cartridge used for fitting (attaching) plate-shaped memory having memory element at memory fitting (attaching) portion to fit (attach) it at a recording and/or reproducing apparatus to thereby carry out recording and/or reproduction of information signals with respect to the plate-shaped memory by this recording and/or reproducing aparatus, and a memory medium comprising such cartridge and plate-shaped memory.

Another object of this invention is to provide a cartridge easy in attachment/detachment with respect to cartridge which is substantially the same as cartridge within which flexible magnetic disc caused to have diameter of 3.5 inches is accommodated, excellent in mechanical strength and convenient in handling, and a memory medium comprising such cartridge and plate-shaped memory.

This invention proposed in order to attain objects as described above is directed to a substantially rectangular cartridge which is substantially common in shape and external size (dimension) to disc cartridge within which flexible magnetic disc caused to have diameter of 3.5 inches is accommodated and composed of upper half and lower half, wherein a memory insertion hole which permits short side and thickness of a substantially rectangular plate-shaped memory is formed at one side or at the other side adjacent to this side of the cartridge, the memory insertion hole being adapted so that the plate-shaped memory is inserted thereinto with short side being as insertion side, a memory fitting (attaching) portion substantially in correspondence with long side of the plate-shaped memory is formed in a manner continuous to the memory insertion hole and in parallel to the side adjacent to the side where memory insertion hole is formed, and a group of terminals connected to terminals provided at insertion side with respect to the memory insertion hole of the plate-shaped memory are provided at the terminating portion of the memory fitting portion.

Moreover, this invention is directed to a memory medium comprising a cartridge which is substantially rectangular common in shape and external size (dimension) to a disc cartridge within which a flexible magnetic disc caused to have diameter of 3.5 inches and composed of an upper half and a lower half, and a substantially rectangular plate-shaped memory having a solid-state memory therewithin, wherein a memory insertion hole which permits short side and thickness of the substantially rectangular plate-shaped memory is formed at one side or the other side adjacent to this side of the cartridge, the memory insertion hole being adapted so that the plate-shaped memory is inserted with short side being as insertion side, a memory fitting portion substantially in correspondence with long side of the plate-shaped memory is formed in a manner continuous to the memory insertion hole and in parallel to side adjacent to the side where the memory insertion hole is formed, and a group of terminals connected to terminals provided at the insertion side with respect to the memory insertion hole of the plate-shaped memory are provided at the terminating portion of the memory fitting portion.

In more practical sense, in the cartridge, one side is caused to be substantially 89.9 mm, the other side is caused to be substantially 93.9 mm, and the thickness is caused to be 3.5 mm. In the plate-shaped memory, the short side is caused to be substantially 21.45 mm, the long side is caused to be substantially 50 mm, and the thickness is caused to be substantially 2.8 mm. In the memory insertion hole, the long side is caused to be substantially 21.7 mm and the short side is caused to be substantially 2.85 mm. In the memory fitting portion, the depth is caused to be substantially 50 mm.

For example, in the cartridge, the memory insertion hole is provided at the other side of the cartridge, and the memory fitting (attaching) portion is formed in parallel to one side of the cartridge, whereby insertion direction with respect to the cartridge of the plate-shaped memory is formed so that it is caused to be direction perpendicular to insertion direction with respect to the recording and/or reproducing apparatus.

Moreover, in the cartridge, the memory insertion hole is provided at one side of the cartridge, and the memory fitting portion is formed in parallel to the other side of the cartridge, whereby insertion direction with respect to the cartridge of the plate-shaped memory is formed so that it is caused to be the same as insertion direction of the recording and/or reproducing apparatus.

At one corner portion of the front face serving as insertion side with respect to memory insertion hole of the plate-shaped memory inserted into such cartridge, there is formed an erroneous insertion preventing groove of which front and bottom surface side are opened. At each terminating portion of the memory fitting portions provided at the two kinds of cartridges, erroneous insertion preventing projection engaged with the erroneous insertion preventing groove is formed to thereby prevent the group of terminals from being damaged as the result of the fact that the front face of the plate-shaped memory and the group of terminals of the memory fitting portion side are in contact with each other when the plate-shaped memory is erroneously inserted, and to project the plate-shaped memory from the insertion hole to thereby allow user to securely recognize erroneous insertion.

Further, the thickness of the plate-shaped memory occupies 80% or more of the thickness of the cartridge. Thus, the plate-shaped memory carries out strength reinforcement of the cartridge.

Furthermore, the long side of the plate-shaped memory has length more than half of one side or the other side of the cartridge to thereby carry out strength reinforcement of the cartridge.

In addition, the short side of the plate-shaped memory is formed so that it is 20% to 25% of one side or the other side of the cartridge. Thus, various electric circuits can be provided at the cartridge while reinforcing strength of the cartridge.

Still further objects of this invention and more practical merits obtained by this invention will become more apparent from the description of the embodiment which will be explained below.

BEST MODE FOR CARRYING OUT THE INVENTION

Embodiments of a cartridge and a memory medium comprising cartridge and plate-shaped memory according to this invention will now be described with reference to the attached drawings.

The cartridge according to this invention is adapted so that a plate-shaped memory as information recording medium is detachably fitted (attached), and it is fitted (attached) at a disc drive unit, whereby recording/reproduction of information with respect to the plate-shaped memory can be carried out through the disc drive unit. In addition, this cartridge 1 is characterized in that insertion direction with respect to the cartridge of the plate-shaped memory is perpendicular to insertion direction with respect to the disc drive unit of the cartridge.

Figure 1:
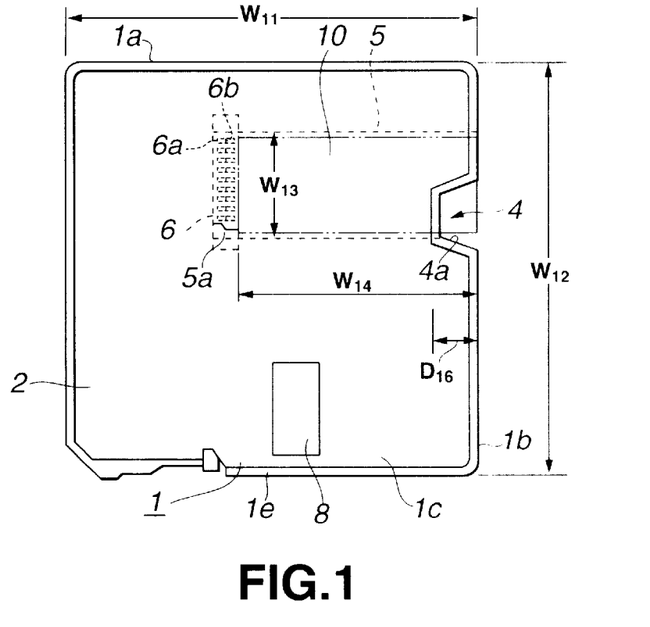
FIG. 1 is a plan view showing a cartridge according to this invention, wherein insertion hole of plate-shaped memory is provided at the side surface perpendicular to insertion direction with respect to disc drive unit.
Figure 2:
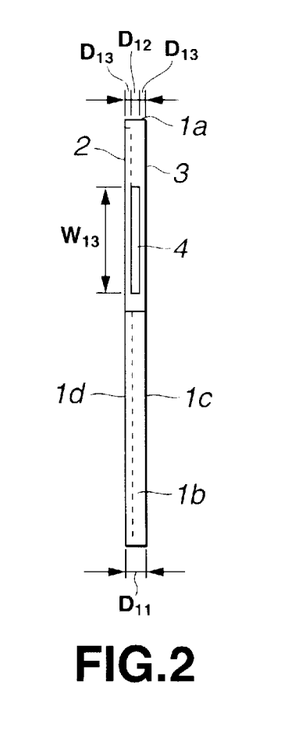
FIG. 2 is a side view of the side of other side where insertion hole into which plate-shaped memory is inserted of the cartridge.

As shown in FIGS. 1 and 2, the cartridge 1 according to this invention is constituted by an upper half 2 comprised of synthetic resin or thin metal plate and a lower half 3 comprised of synthetic resin so that it takes rectangular shape, and is formed so as to have substantially the same size (dimensions) as disc cartridge within which flexible magnetic disc caused to have diameter of 3.5 inches is accommodated. Namely, as shown in FIG. 1, the cartridge 1 according to this invention is formed rectangular so that length $W_{11}$ of one side is 89.9±0.1 mm, length $W_{12}$ of the other side is 93.9±0.1 mm and thickness $D_{11}$ is 3.5 mm at the maximum. In addition, this cartridge 1 is adapted so that an input/output unit 8 with which magnetic head of the disc drive unit is in contact is provided substantially in the center of insertion side with respect to the disc drive unit.

At a side surface 1b along the other side caused to be 93.9±0.1 mm of this cartridge 1, an insertion hole 4 of plate-shaped memory which will be described later is formed. This insertion hole 4 is formed substantially rectangular, and is formed so as to permit thickness and short side of plate-shaped memory 10 in which the short side is caused to be 21.45±0.05 mm, the long side is caused to be 50±0.2 mm and thickness is caused to be 2.8±0.05 mm. As shown in FIGS. 1 and 2, the insertion hole 4 is provided at the position caused to undergo displacement toward side surface 1a side along one side perpendicular to this side surface 1b from the center of the side surface 1b along the other side. In more practical sense, as shown in FIG. 2, this insertion hole 4 is adapted so that length $W_{13}$ of long side is caused to be 21.7±0.2 mm and length $D_{12}$ of the short side is caused to be 2.85 mm. Namely, the insertion hole 4 is formed so as to take size (dimensions) such that the plate-shaped memory 10 can be inserted. Moreover, within the cartridge 1, there is provided a plate-shaped memory fitting (attaching) portion 5 is provided in a manner continuous to the insertion hole 4 and in parallel to one side of the cartridge 1. Namely, the plate-shaped memory fitting portion 5 is provided substantially in parallel to side surface 1a adjacent to this side surface 1b from the side surface 1b where the insertion hole 4 is provided. In this example, at plane surface 1c and bottom surface 1d opposite to each other of the cartridge 1, there is formed a cut recessed portion 4a for finger hook caused to face, to the external, a portion of the plate-shaped memory 10 fitted (attached) at the plate-shaped memory fitting portion 5 and for facilitating taking out of the plate-shaped memory 10. In more practical sense, this cut recessed portion 4a is formed so that depth $D_{16}$ of the cut portion is caused to be 5.05±0.3 mm so as to facilitate putting of fingers.

Figure 3:
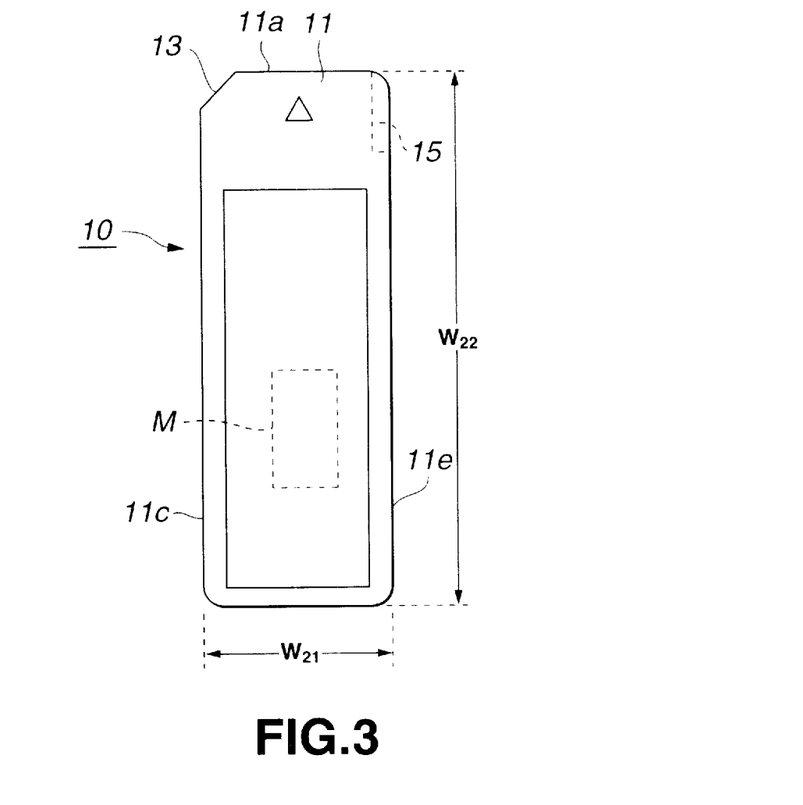
FIG. 3 is a plan view showing plate-shaped memory fitted (attached) at the cartridge.
Figure 4:
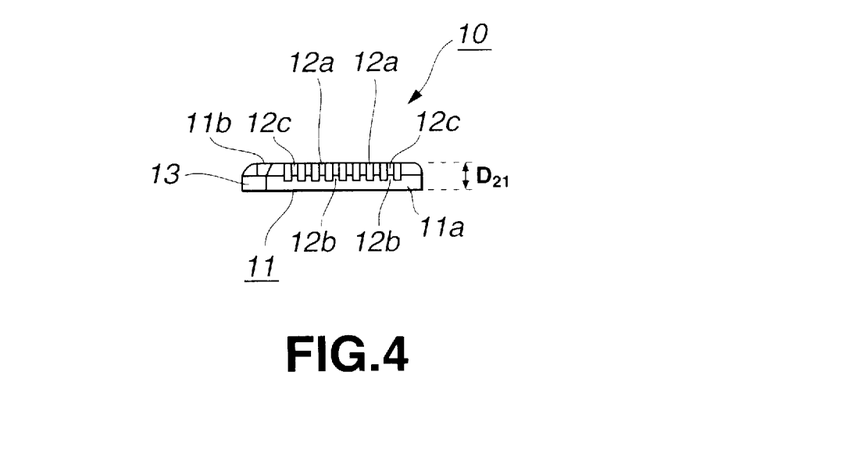
FIG. 4 is a front view of the plate-shaped memory.

The plate-shaped memory 10 fitted (attached) on the plate-shaped memory fitting (attaching) portion 5 is formed, as shown in FIGS. 3 and 4, substantially rectangular so that length $W_{21}$ of the short side is caused to be 21.45±0.05 mm, length $W_{22}$ of the long side is caused to be 50±0.2 mm and thickness $D_{21}$ is caused to be 2.8±0.05 mm. This plate-shaped memory 10 is provided with a casing 11 constituting memory body obtained by molding synthetic resin having rigidity. This casing 11 has mechanical strength and is adapted so that memory element M which is solid-state memory, such as, for example, flash memory, etc. having memory capacity more than 32 mega bytes is provided therewithin. Namely, the casing 11 is formed so as to have mechanical strength to such a degree that it is not bent by ordinary external force, etc. applied at the time of use, and protects electric circuits such as memory element M, etc. therewithin.

At the side of one short side of the casing 11 constituting the plate-shaped memory 10, as shown in FIGS. 3 and 4, a terminal portion 12 is formed in a manner extending from a front face 11a of the casing toward the bottom surface 11b thereof. In this terminal portion 12, engagement recessed portions 12c with which a group of terminals provided at the cartridge 1 side are engaged are partitioned by partitioning walls 12a by the number of electrodes, and plural electrodes 12b separated with each other by the partitioning walls 12a are provided at the bottom surfaces of these engagement recessed portions 12c. At this plate-shaped memory 10, nine electrodes 12b are provided.

Further, read or write operation of information with respect to the memory element M provided within the casing 11 is carried out through the elctrodes 12b provided at the terminal portion 12.

Figure 5:
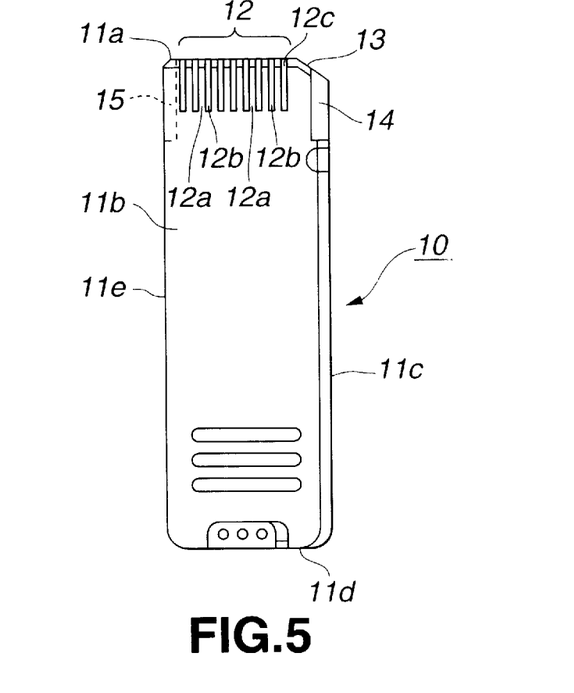
FIG. 5 is a bottom view of the plate-shaped memory.
Figure 6:
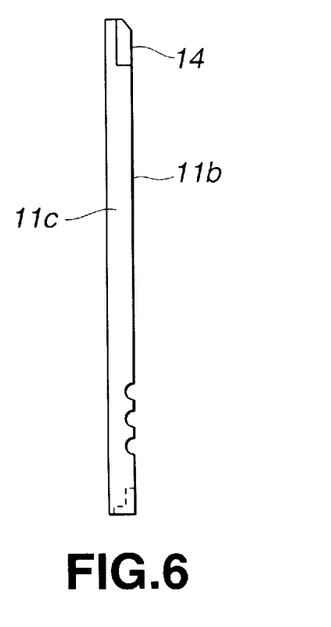
FIG. 6 is a side view of the plate-shaped memory.

In addition, at one corner portion of front face 1a side where terminal portion 12 is provided of the casing 11, as shown in FIGS. 3 and 5, a cut portion 13 is provided. At side surface 11c of the side where cut portion 13 is formed of the casing 11, as shown in FIGS. 5 and 6, an erroneous insertion preventing groove 14 where the bottom surface 11b side is opened is formed in a manner continuous to the cut portion 13. The cut portion 13 and the erroneous insertion preventing groove 14 are adapted so that when the plate-shaped memory 10 is fitted (attached) at the cartridge 1, they restrict (regulate) insertion direction with respect to the cartridge 1 to prevent erroneous insertion. Namely, the cut portion 13 and the erroneous insertion preventing groove 14 are adapted so that when the plate-shaped memory 10 is not inserted from the insertion hole 4 in normal state, they allow the electrodes 12b and a group of terminals of the cartridge 1 side not to be engaged with engagement recessed portions 12c partitioned by the partitioning walls 12a of the terminal portion 12 so that the electrodes 12b and the group of terminals 6 are not in contact with each other.

The substantially rectangular plate-shaped memory fitting (attaching) portion 5 provided at the cartridge 1 where the plate-shaped memory 10 as formed in this way is fitted (attached) is formed, as shown in FIG. 1, so as to have size (dimensions) sufficient to accommodate short side and long side of the plate-shaped memory 10, and is formed so that length $W_{14}$ of depth from the insertion hole 4 is caused to be 50±0.3 mm. Namely, length $W_{14}$ of depth of the plate-shaped memory fitting (attaching) portion 5 is formed so as to have substantially the same as length $W_{22}$ of long side of the plate-shaped memory 10. Thus, a rear surface 11d of the plate-shaped memory 10 is substantially flush with side surface 1b along the other side when the plate-shaped memory 10 is fitted (attached) at the plate-shaped memory fitting (attaching) portion 5, thereby preventing outward appearance or touch of the cartridge 1 from being poor. Further, the rear surface 11d is projected from the side surface 1b along the other side so that attachment/detachment with respect to the disc drive unit of the cartridge is not impeded. In this example, the width is the same as the length $W_{13}$ of the long side of the insertion hole 4 of 21.7±0.2 mm. In addition, thickness $D_{13}$ of the upper and lower halves 2, 3 in the area where the plate-shaped memory fitting portion 5 is provided from the insertion hole 4 has extremely thin thickness of 0.255 mm (plate thickness 0.24 mm+coating 0.015 mm).

Figure 7:
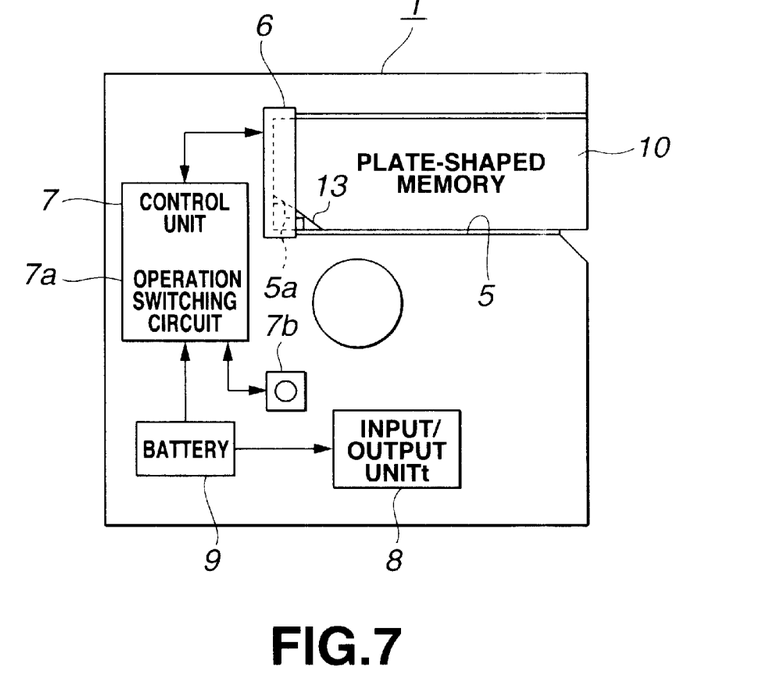
FIG. 7 is a block diagram showing internal structure of the cartridge according to this invention.

As shown in FIGS. 1 and 7, at the end portion of the internal side of this plate-shaped memory fitting (attaching) portion 5, there are provided a group of terminals 6 electrically connected to the terminal portion 12 provided at the plate-shaped memory 10 fitted or attached at the plate-shaped memory fitting (attaching) portion 5. Such group of terminals 6 are formed by bending leaf spring-shaped linear members 6a having conductivity serving as respective terminals so that they are mountain-shaped. Such linear members 6a are admitted into engagement recessed portions 12c between partitioning walls 12a of the terminal portion 12 so that vertex portions 6b come into contact with electrodes 12b. Thus, electric connection is provided. Further, the linear members 6a are engaged with engagement recessed portions 12c. Thus, the vertex portions 6b are in pressure contact with the electrodes 12b to thereby hold the plate-shaped memory 10 at fitting (attachment) position.

Further, at one corner portion of the terminating portion of the plate-shaped memory fitting (attaching) portion 5, i.e., in the area where the cut portion 13 and the erroneous insertion preventing groove 14 are positioned when the plate-shaped memory 10 is inserted into the plate-shaped memory fitting (attaching) portion 5 in normal state, there is provided an erroneous insertion preventing projection 5a for preventing erroneous insertion of the plate-shaped memory 10. This erroneous insertion preventing projection 5a is formed so as to have a shape such that it is engaged with the cut portion 13 and the erroneous insertion preventing groove 14 when the plate-shaped memory 10 is fitted (attached) at the fitting (attaching) portion 5 in normal state. When the plate-shaped memory 10 is inserted into the plate-shaped memory fitting (attaching) portion 5 in abnormal state, e.g., in reversal state, the erroneous insertion preventing projection 5a impinges upon front face 11a of the plate-shaped memory 10. As a result, at the plate-shaped memory 10, the rear surface 11d is protruded from the insertion hole 4, and the linear members 6a of the group of terminals 6 are placed in the state where they are not engaged with the engagement recessed portions 12c of the terminal portion 12. Thus, there is no possibility that the group of terminals 6 of the plate-shaped memory fitting (attaching) portion 5 are in contact with the front face 11a of the casing 11 of the plate-shaped memory 10, are prevented from being stained.

Further, at the inside of the cartridge, as shown in FIG. 7, rigid or flexible printed wiring board is disposed. On this board, there are arranged a control unit 7 connected to the group of terminals 6 serving as interface with the plate-shaped memory 10, an input/output unit 8 with which magnetic head (not shown) provided at the disc drive unit side where this cartridge 1 is fitted (attached) is in contact, and a battery 9 for supplying power to the control unit 7 and the input/output unit 8, etc. The control unit 7 carries out data transmission processing between the plate-shaped memory 10 and the disc drive unit, and includes an operation switching circuit 7a for switching electric circuits from power-saving mode to operation mode to carry out data transmission. Further, a light receiving portion 7b for light-receiving, from the disc drive unit side, a control signal for switching mode from the power-saving mode to the operation mode is connected to the control unit 7. In the cartridge 1 having such electric circuits, when the cartridge 1 is loaded with respect to the disc drive unit and is driven in the state where the plate-shaped memory 10 is fitted (attached) at the plate-shaped memory fitting (attaching) portion 5, a control signal light-emitted from light emitting element of the disc drive unit side is received by the light receiving portion 7b. The light receiving portion 7b carries out photo-electric conversion of this control signal to deliver it to the operation switching circuit 7a. The operation switching circuit 7a switches the control unit 7 from the power saving mode to the operation mode for carrying out data transmission between the plate-shaped memory 10 and the disc drive unit. Further, magnetic head of the disc drive unit side (not shown) is caused to be in contact with the input/output unit 8. Thus, data from the disc drive unit is recorded into the memory element of the plate-shaped memory 10 by the control unit 7, and the data recorded in the memory element M is read out to the disc drive unit through the control unit 7. In a manner stated above, at the cartridge 1, only when data transmission is carried out, control is made such that the control unit 7 becomes active. On the contrary, when data transmission is not carried out, there results power-saving mode so that power-saving can be provided.

The plate-shaped memory 10 constituted as described above is accommodated into the plate-shaped memory fitting (attaching) portion 5 within the cartridge 1 through the insertion hole 4 provided at side surface 1b along the other side with the front face 11a side where the terminal portion 12 is provided being as insertion end. When this plate-shaped memory 10 is inserted until the innermost portion of the plate-shaped memory fitting (attaching) portion 5, it is held within the plate-shaped memory fitting portion 5 as indicated by phantom lines in FIG. 1. Thus, the terminal portion 12 is electrically connected to the group of electrodes provided at the cartridge 1. Namely, linear members 6a of the group of terminals 6 of the plate-shaped memory fitting (attaching) portion 5 side are engaged with engagement recessed portions 12c constituting the terminal portion of the plate-shaped memory 10. As a result, the vertex portions 6b come into contact with the electrodes 12b so that electric connection is provided. Thus, the vertex portions 6b are caused to be in pressure contact with the electrodes 12b so that the plate-shaped memory 10 is held by the plate-shaped memory fitting (attaching) portion 5.

Moreover, when the plate-shaped memory 10 is inserted into the plate-shaped memory fitting portion 5 in abnormal state, e.g., in the reversal state, the erroneous insertion preventing projection 5a impinges upon the front face 11a of the plate-shaped memory 10. As a result, the plate-shaped memory 10 is adapted so that the rear surface lid is protruded from the insertion hole 4, resulting in the state where the group of terminals 6 are not engaged with the terminal portion 12. Thus, there is no possibility that the group of terminals 6 of the plate-shaped memory fitting portion 5 may come into contact with the front face 11a of the casing 11 of the plate-shaped memory 10, and are prevented from being stained. In addition, when the plate-shaped memory 10 is inserted into the plate-shaped memory fitting portion 5 in abnormal state, the rear surface 11d of the plate-shaped memory 10 is protected from the insertion hole 4. For this reason, user can easily recognize that the plate-shaped memory 10 is not inserted in the normal state.

Meanwhile, since the cartridge 1 where plate-shaped memory 10 caused to have thickness of 2.8±0.05 mm is fitted (attached) is formed so that its thickness is equal to substantially 3.5 mm, it is impossible to sufficiently take thickness of the portion where the plate-shaped memory fitting portion 5 is provided, and each thickness $D_{13}$ of upper and lower halves 2, 3 of the area where the plate-shaped memory portion 5 is provided has extremely thin thickness of 0.255 mm. As a result, it becomes impossible to maintain sufficient mechanical strength.

However, as shown in FIG. 1, the plate-shaped memory 10 is placed in the state tightly in contact with the upper half 2 and the lower half 3 constituting the cartridge 1 at the position where it is accommodated at the plate-shaped memory fitting portion 5 of the cartridge 1. In this case, the plate-shaped memory fitting portion 5 is formed so as to have thickness substantially equal to thickness of plate-shaped memory in which there is not large difference in thickness with respect to the cartridge 1. Namely, plate-shaped memory 10 having thickness of 2.8±0.05 mm is formed so that it occupies more than 80% of the cartridge 1 having thickness of 3.5 mm. In addition, the long side of the plate-shaped memory 10 is 50±0.2 mm, which has length more than half of length of one side of cartridge 1 caused to have one side of 89.9±0.1 mm.

For this reason, the plate-shaped memory 10 accommodated within the plate-shaped memory fitting portion 5 functions as reinforcement member of the cartridge 1 to enhance strength of the cartridge 1. Particularly, since the plate-shaped memory 10 has mechanical strength as described above even in the case where the upper half 2 and the lower half 3 are caused to have thin thickness for the purpose of forming the plate-shaped memory fitting portion 5, it sufficiently functions as reinforcement member for reinforcing such portion, thus making it possible to enhance strength of the entirety of the cartridge 1.

In addition, since length of short side of the plate-shaped memory 10 is caused to be 21.45±0.05 mm and is caused to be less than 25% of length of the other side of the cartridge 1 caused to have length of 93.9±0.1 mm, large space can be provided within the cartridge 1. Thus, a larger number of circuits can be provided within the cartridge 1. In this example, for the purpose of ensuring mechanical strength of the cartridge 1, length of short side of the plate-shaped memory 10 is caused to be at least more than 20% of the length of the other side of the cartridge 1.

In order to take out, from the cartridge 1, the plate-shaped memory 10 accommodated within the plate-shaped memory fitting portion 5, lock mechanism of the plate-shaped memory 10 (not shown) provided at the cartridge 1 is released. When the lock mechanism is released, the plate-shaped memory 10 is adapted so that a portion of the rear surface 11d side of the casing 11 is projected from the cartridge 1. User picks up the end portion of the rear surface 11d side of the plate-shaped memory 10 projected from the cartridge 1 to draw it from the plate-shaped memory fitting portion 5, thereby making it possible to take out the plate-shaped memory 10.

The cartridge 1 at which plate-shaped memory 10 as described above is fitted (attached) is loaded with respect to the disc drive unit with side surface 1e of the side where the input/output unit 8 is provided being as insertion end similarly to the disc cartridge within which there is accommodated flexible magnetic disc caused to have diameter of 3.5 inches as shown in FIG. 1. Since the plate-shaped memory 10 serves as reinforcement member as described above, the cartridge 1 is difficult to undergo bending deformation at the time of attachment/detachment with respect to the disc drive unit, etc. Thus, it can be prevented that the internal circuit is deformed and broken. In addition, length $W_{14}$ of depth of the plate-shaped memory fitting portion 5 is formed so that it is substantially the same as length $W_{22}$ of long side of the plate-shaped memory 10, and rear surface 11d of the plate-shaped memory 10 is substantially flush with side surface 1b along the other side when the plate-shaped memory 10 is fitted at the plate-shaped memory fitting portion 5. For this reason, it is possible to smoothly carry out attachment/detachment with respect to the disc drive unit.

Figure 8:
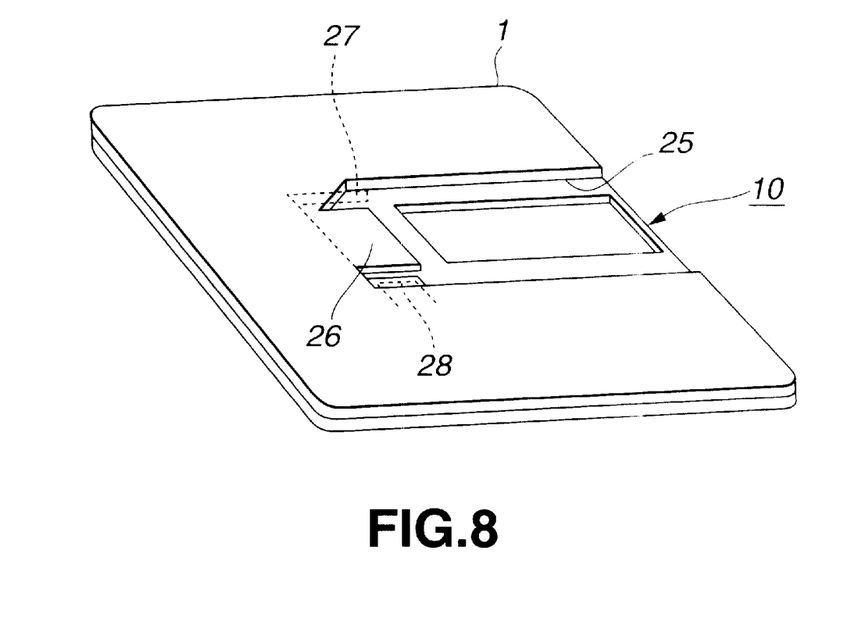
FIG. 8 is a perspective view showing another example of the cartridge according to this invention.

It is to be noted that while the plate-shaped memory fitting portion 5 provided at the above-described cartridge 1 is constituted in a manner to accommodate substantially the entirety of the plate-shaped memory 10, a cut portion 25 corresponding to external shape of the plate-shaped memory 10 may be provided as shown in FIG. 8 to arrange plate-shaped memory 10 within this cut portion 25.

Also in this cartridge, there are provided group of terminals 6 to which terminal portion 12 provided at the front face 11a side of the plate-shaped memory 10 is connected at the internal end of the cut portion 25. The plate-shaped memory 10 arranged within the cut recessed portion 25 is held by the cartridge 1 as the result of the fact that the terminal portion 12 is caused to undergo insertion/engagement with respect to the group of terminals 6.

Since there is the possibility that the plate-shaped memory 10 may be easily detached from the cartridge 1 only in the case of engagement between the terminal portion 12 and the group of terminals 6, a supporting piece 26 for covering the terminal portion 12 connected to the group of terminals 6 is provided in a projected manner (hereinafter simply referred to as projected as occasion may demand) toward the inside of the cut portion 25 in the cartridge 1 shown in FIG. 8. The supporting piece 26 is projected in a manner opposite to each other from the upper half 2 and the lower half 3 of the cartridge 1 to put or hold the portion where the terminal portion 12 is provided of the plate-shaped memory 10 from the lower side.

It is to be noted that it is sufficient that the supporting piece 26 is formed so as to have length sufficient to support the portion where the terminal portion 12 is provided of the plate-shaped memory 10.

Meanwhile, since the plate-shaped memory 10 used here is formed so as to have thickness of 2.8±0.05 mm which is not great difference in thickness with respect to cartridge 1 of which thickness is 3.5 mm, even in the case where it is disposed at the cut portion 25 of which upper and lower surfaces are opened, there is no possibility that there takes place large offset at upper and lower surfaces of the cartridge 1. Accordingly, this cartridge 1 can prevent user from giving feeling of disagreement at the time of use.

Moreover, in the case where the memory fitting portion is formed as cut recessed portion 25 of which upper and lower surfaces are opened, there may be provided, at side surfaces opposite to each other of the cut recessed portion 25, engagement projections 27, 28 engaged with the erroneous insertion preventing groove 14 provided at side surface 11c of the plate-shaped memory 10 and engagement groove 15 provided at the other side surface 11e thereof. By providing such engagement projections 27, 28, even in the case where the memory fitting portion 5 is formed as cut recessed portion 25 of which upper and lower surfaces are opened, it is possible to securely hold plate-shaped memory 10 at the cartridge 1.

It is to be noted that in the case where engagement projections 27, 28 are provided, it is sufficient that supporting piece 26 for supporting the portion where terminal portion 12 is provided is not provided.

In the case where the memory fitting portion 5 is formed as cut recessed portion 25 of which upper and lower surfaces are opened, it is possible to easily carry out attachment/detachment of the plate-shaped memory 10.

Figure 9:
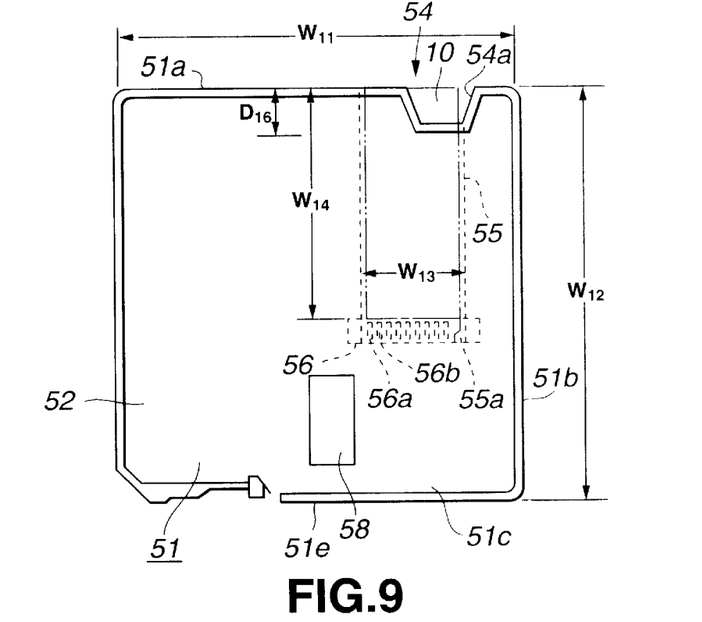
FIG. 9 is a plan view of a cartridge according to this invention, wherein the cartridge is formed so that insertion direction of plate-shaped memory and insertion direction with respect to disc drive unit are the same.

Another embodiment of the cartridge 1 according to this invention will now be described. In this cartridge 51, plate-shaped memory which is the same as the cartridge 1 is used. This cartridge 51 is characterized in that insertion direction into the cartridge 51 of the plate-shaped memory 10 and insertion direction into the disc drive unit are the same.

This cartridge 51 is formed substantially rectangular by upper and lower halves 52, 53 consisting of synthetic resin or thin metal plate, and is formed so as to have substantially the same size (dimensions) as disc cartridge within which flexible magnetic disc caused to have diameter of 3.5 inches is accommodated similarly to the above-described cartridge 1. Namely, this cartridge 51 is formed, similarly to the above-described cartridge 1, so as to take rectangular shape such that length $W_{11}$ of one side is caused to be 89.9±0.1 mm, length $W_{12}$ of the other side is caused to be 93.9±0.1 mm and thickness $D_{11}$ is caused to be 3.5 mm at the maximum. In addition, this cartridge 51 is adapted so that an input/output unit 58 with which magnetic head of the disc drive unit is in contact is provided substantially in the center of the insertion side into the disc drive unit.

Figure 10:
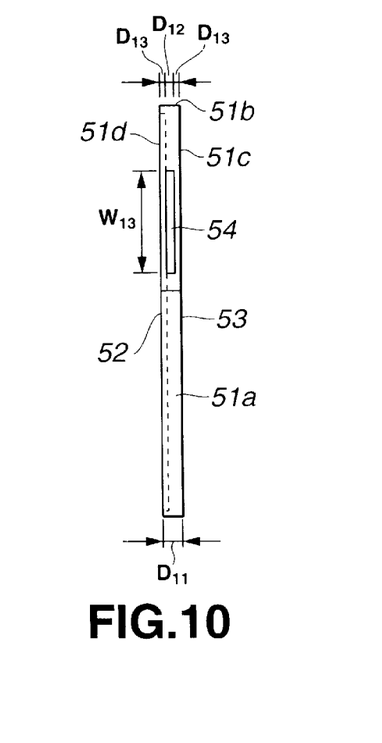
FIG. 10 is a side view of the side of one side where insertion hole into which plate-shaped memory is inserted of the cartridge shown in FIG. 9 is provided.

Further, at a side surface 51a along one side caused to be 89.9±0.1 mm of this cartridge 51, there is formed an insertion hole 54 for inserting the plate-shaped memory 10 into the cartridge 51. This insertion hole 54 is formed so as to permit thickness and short side of the plate-shaped memory 10, and is provided at position caused to undergo displacement toward the side surface 51b side along one side perpendicular to this side surface 51a from the center of the side surface 51a along one side. In more practical sense, as shown in FIG. 10, similarly to the above-described insertion hole 4, this insertion hole 54 is formed so as to have a size to permit insertion of the plate-shaped memory 10 such that length $W_{13}$ of long side is caused to be 21.7±0.2 mm, and length $D_{12}$ of short side is caused to be 2.85 mm. In addition, within the cartridge 51, there is provided a plate-shaped memory fitting (attaching) portion 55 at which the plate-shaped memory 10 is fitted (attached) in a manner continuous to the insertion hole 54. This plate-shaped memory fitting portion 55 is provided substantially in parallel to side surface 51b adjacent to this side surface 51a from the side surface 51a where the insertion hole 54 is provided. In this example, at the plane surface 51c and bottom surface 51d which are opposite to each other of the cartridge 51, there is formed a cut recessed portion 54a for putting finger for facing, toward the external, a portion of the plate-shaped memory 10 fitted (attached) at the plate-shaped memory fitting portion 55 to facilitate taking-out of the plate-shaped memory 10. In more practical sense, this cut recessed portion 54a is formed so that depth $D_{16}$ of the cut portion is caused to be 5.05±0.3 mm for making it easy to put fingers.

As shown in FIG. 9, the plate-shaped memory fitting (attaching) portion 55 at which the plate-shaped memory 10 is fitted (attached) is formed so as to have size (dimensions) sufficient to accommodate short side and long side of the plate-shaped memory 10, and is formed so that length $W_{14}$ of depth from the insertion hole 54 is equal to 50±0.3 mm. Namely, the length $W_{14}$ of the depth of the plate-shaped memory fitting (attaching) portion 55 is formed so as to have substantially the same length as length $W_{22}$ of long side of the plate-shaped memory 10. Accordingly, when the plate-shaped memory 10 is fitted (attached) at the plate-shaped memory fitting (attaching) portion 55, the rear surface 11d of the plate-shaped memory 10 is substantially flush with the side surface 51a along one side, thus to prevent that outward appearance and/or touch of the cartridge 51 become bad. Further, as the result of the fact that the rear surface 11d is projected from the side surface 51a along one side, attachment/detachment with respect to the disc drive unit of the cartridge 51 is not impeded. In addition, each thickness $D_{13}$ of the upper and lower halves 52, 53 of the area where the plate-shaped memory fitting (attaching) portion 55 is provided from the insertion hole 54 has extremely thin thickness of 0.255 mm (plate thickness 0.24 mm+coating 0.015 mm).

At the end portion of the internal side of this plate-shaped memory fitting portion 55, as shown in FIG. 9, there are provided a group of terminals 56 electrically connected to the terminal portion 12 provided at the plate-shaped memory 10 fitted (attached) at the plate-shaped memory attaching portion 55. Such group of terminals 56 are formed by bending spring-shaped linear members 56a having conductivity serving as respective terminals so that they are mountain-shaped. As the result of the fact that such linear members 56 are admitted into the engagement recessed portions 12c between partitioning walls 12a of the terminal portion 12 so that vertex portions 56b comes into contact with electrodes 12b, electric connection is provided. In addition, the linear members 56a are engaged with engagement recessed portions 12c and the vertex portions 56b are caused to be in pressure contact with the electrodes 12b to thereby hold the plate-shaped memory 10 at fitting (attachment) position.

Further, at one corner portion of the terminating portion of the plate-shaped memory fitting portion 55, i.e., in the area where cut portion 13 and erroneous insertion preventing groove 14 are positioned when the plate-shaped memory 10 is inserted into the plate-shaped memory fitting portion 55 in normal state, there is provided an erroneous insertion preventing projection 55a for preventing erroneous insertion of the plate-shaped memory 10. This erroneous insertion preventing projection 55a is formed so as to take shape adapted to be engaged with the cut portion 13 and the erroneous insertion preventing groove 14 when the plate-shaped memory 10 is fitted (attached) at the plate-shaped memory fitting portion 55 in normal state. When the plate-shaped memory 10 is inserted into the plate-shaped memory fitting portion 55 in abnormal state, e.g., in reversal state, the erroneous insertion preventing projection 55a impinges upon the front face 11a of the plate-shaped memory 10. As a result, the plate-shaped memory 10 is adapted so that the rear surface 11d is protruded from the insertion hole 54, resulting in the state where the group of terminals 56 are not engaged with the terminal portion 12. Thus, there is no possibility that the group of terminals 56 of the plate-shaped memory fitting portion 55 come into contact with the front face 11a of the casing 11 of the plate-shaped memory 10 so that they are prevented from being stained.

Moreover, at the inside of the cartridge 51, rigid or flexible printed wiring board is disposed. On the printed wiring board, there are arranged control unit 7 including operations switching circuit 7a and light receiving portion 7b and battery 9.

At the cartridge 51 constituted as described above, the plate-shaped memory 10 is fitted (loaded) at the plate-shaped memory fitting (attaching) portion 55 with the front face 11a where the terminal portion 12 is provided being as insertion end from insertion hole 54 provided at side surface 51a along one side. When this plate-shaped memory 10 is inserted into the innermost portion of the plate-shaped memory fitting portion 55 as shown in FIG. 9, it is held within the plate-shaped memory fitting portion 55 as indicated by phantom lines in FIG. 9. Further, linear members 56a of the group of terminals 56 of the plate-shaped memory fitting portion 55 side are engaged with engagement recessed portions 12c constituting the terminal portion 12 of the plate-shaped memory 10, and vertex portions 56b come into contact with the electrodes 12b. Thus, electric connection is provided.

Further, when plate-shaped memory 10 is inserted into the plate-shaped memory fitting portion 55 in abnormal state, e.g., in reversal state, the erroneous insertion preventing projection 55a impinges upon the front face 11a of the plate-shaped memory 10. As a result, the plate-shaped memory 10 is adapted so that rear surface 11d is protruded from insertion hole 54, resulting in the state where the group of terminals 56 are not engaged with the terminal portion 12. Thus, there is no possibility that the group of terminals 56 of the plate-shaped memory fitting portion 55 may come into contact with the front face 11a of the casing 11 of the plate-shaped memory 10, and are prevented from being stained. In addition, when the plate-shaped memory 10 is inserted into the plate-shaped memory fitting portion 55 in abnormal state, the rear surface 11d of the plate-shaped memory 10 is protruded from the insertion hole 54. For this reason, user can easily recognize that the plate-shaped memory 10 is not inserted in normal state.

Meanwhile, as shown in FIG. 9, the plate-shaped memory 10 is placed in the state tightly in contact with the upper half 52 and the lower half 53 constituting the cartridge 51 at the position where it is accommodated within the plate-shaped memory fitting portion 55 of the cartridge 51. In this case, the plate-shaped memory 10 having thickness of 2.8±0.05 mm is formed so as to occupy more than 80% of the cartridge 51 having thickness of 3.5 mm. Further, the plate-shaped memory 10 having long side of 50±0.2 mm is formed so as to have length which is more than half of the other side of the cartridge 51 of 93.9±0.1 mm. Accordingly, the plate-shaped memory 10 accommodated within the plate-shaped memory fitting portion 55 functions as reinforcement member of the cartridge 51 to enhance strength of the cartridge 51. Particularly, even in the case where the upper half 52 and the lower half 53 are caused to be thin thickness for the purpose of forming the plate-shaped memory fitting portion 55, since the plate-shaped memory 10 has mechanical strength as described above, it sufficiently functions as reinforcement member for reinforcing such portion, thus making it possible to enhance strength of the entirety of the cartridge 51.

Further, since length of short side of the plate-shaped memory 10 is caused to be 21.45±0.05 mm, which is less than 25% of length of one side of cartridge 51 having length of 89.9±0.1 mm, large space can be provided within the cartridge 51, and a larger number of circuits can be provided within the cartridge 51. In this example, length of short side of the plate-shaped memory 10 is caused to be at least more than 20% of length of one side of the cartridge 51 for the purpose of ensuring mechanical strength of the cartridge 51.

In order to take out, from the cartridge 51, the plate-shaped memory 10 accommodated within the plate-shaped memory fitting portion 55, lock mechanism of the plate-shaped memory 10 (not shown) provided at the cartridge 51 is released. When the lock mechanism is released, the plate-shaped memory 10 is adapted so that a portion of the rear surface 11*d* side of the casing 11 is projected from the cartridge 51. User picks up the end portion of the rear surface 11*d* side of the plate-shaped memory 10 projected from the cartridge 51 to draw it from the plate-shaped memory fitting portion 55, thereby making it possible to take out the plate-shaped memory 10.

As shown in FIG. 9, the cartridge 51 at which the plate-shaped memory 10 as described above is fitted is loaded into the disc drive unit with side surface 1*e* of the side where the input/output unit 8 is provided being as insertion end. At the time of insertion/withdrawal of the cartridge 51 with respect to the disc drive unit, there takes place an external force for allowing the cartridge 51 to undergo bending deformation in a direction perpendicular to plane surface 51*c* or bottom surface 51*d* of the cartridge 51. However, since the plate-shaped memory 10 having mechanical strength functions as reinforcement member, the cartridge 51 is prevented from undergoing bending deformation, thus making it possible to protect, e.g., electric circuits provided therewithin. Further, at this cartridge 51, since insertion direction into the cartridge 51 of the plate-shaped memory 10 and insertion direction into the disc drive unit of the cartridge 51 are the same, it can be prevented that user erroneously recognize insertion direction into the disc drive unit. For example, it can be prevented that the magnetic head of the disc drive unit side is stained. In addition, even if a portion of the rear surface 11*d* side of the plate-shaped memory 10 is inadvertently protruded at the time of ejection from the disc drive unit of the cartridge 51, it is possible to smoothly take out the cartridge 51 from the disc drive unit.

It is to be noted that while detail is omitted, this cartridge 51 may be caused to be of the configuration as shown in FIG. 8.

Industrial Applicability

As described above, in accordance with the cartridge according to this invention, since the plate-shaped memory can be utilized as reinforcement member of the cartridge, it is possible to enhance strength of the cartridge.

Moreover, since the plate-shaped memory can be fitted (attached) at the cartridge in a manner tightly in contact therewith, it is possible to constitute cartridge excellent in vibration-proof effect.

Further, since long side of the plate-shaped memory attached at the cartridge is longer than half of length of one side of the cartridge, the plate-shaped memory serves as a beam of the cartridge when the plate-shaped memory is fitted (attached) at the cartridge. Thus, it is possible to enhance strength of the cartridge together with the fact that the plate-shaped memory is tightly fitted (attached) at the cartridge.

In addition, since the plate-shaped memory is formed large as compared to the conventional plate-shaped memory, not only attachment with respect to the cartridge is easy, but also carrying is easy and there is less possibility that the plate-shaped memory is missing at the time of carrying.

What is claimed is:

1. A substantially rectangular cartridge being common in shape and external size to a disc cartridge in which a flexible magnetic disc having a diameter of 3.5 inches is accommodated, comprising:

an upper half; and a lower half, wherein at one side of the cartridge there is formed a memory insertion hole for receiving a short side and a thickness of a substantially rectangular plate-shaped memory, the memory insertion hole being adapted so that the plate-shaped shaped memory is inserted thereinto with the short side being an insertion side, wherein a memory attaching portion substantially in correspondence with a long side of the plate-shaped memory is formed in the cartridge in a manner continuous to the memory insertion hole and in parallel to a side of the cartridge adjacent to the one side where the memory insertion hole is formed, and wherein at a terminating portion of the memory attaching portion there are provided a group of terminals for connection to terminals provided on the plate-shaped memory.

2. The cartridge as set forth in claim 1, wherein the rectangular cartridge is adapted so that one side is substantially 89.9 mm, an other side is substantially 93.9 mm, and a thickness is substantially 3.5 mm, wherein the plate-shaped memory is adapted so that the short side is substantially 21.45 mm, the long side is substantially 50 mm, and the thickness is substantially 2.8 mm, wherein the memory insertion hole is adapted so that a long side is substantially 21.7 mm and a short side is substantially 2.85 mm; and wherein the memory attaching portion is adapted so that a depth is substantially 50.0 mm.

3. The cartridge as set forth in claim 2, wherein at one corner portion of a front face serving as the insertion side of the plate-shaped memory, there is formed an erroneous insertion preventing groove of which a front side and bottom side are opened; and wherein, at the terminating portion of the memory attaching portion, there is formed an erroneous insertion preventing projection that engages with the erroneous insertion preventing groove.

4. The cartridge as set forth in claim 2, wherein the thickness of the plate-shaped memory is more than 80% of the thickness of the cartridge.

5. The cartridge as set forth in claim 2, wherein the short side of the plate-shaped memory is 20% to 25% of the other side of the cartridge.

6. The cartridge as set forth in claim 1, wherein the long side of the plate-shaped memory has a length that is more than half a length of one side of the cartridge.

7. The cartridge as set forth in claim 1, wherein the memory insertion hole is provided at one side of the cartridge, and the memory fitting (attaching) portion is formed in parallel with the other side of the cartridge.

8. The cartridge as set forth in claim 7, wherein the plate-shaped memory is inserted into a recording and/or reproducing apparatus from a same direction in which the plate-shaped memory is inserted into the memory attaching portion.

9. The cartridge as set forth in claim 7, wherein at one corner portion of a front face serving as the insertion side of the plate-shaped memory, there is an erroneous insertion preventing groove of which a front side and bottom side are opened; and
   wherein at the terminating portion of the memory attaching portion there is formed an erroneous insertion preventing projection that engages with the erroneous insertion preventing groove.

10. The cartridge as set forth in claim 7, wherein the thickness of the plate-shaped memory is more than 80% of a thickness of the cartridge.

11. The cartridge as set forth in claim 7, wherein the long side of the plate-shaped memory has a length that is more than half of the other side of the cartridge.

12. The cartridge as set forth in claim 7, wherein the short side of the plate-shaped memory is 20% to 25% of the other side of the cartridge.

13. A memory medium comprising a substantially rectangular cartridge being common in shape and external size to a disc cartridge in which a flexible magnetic disc having a diameter of 3.5 inches is accommodated, comprising:
   an upper half;
   a lower half; and
   a substantially rectangular plate-shaped memory including a solid-state memory therewithin,
      wherein at one side of the cartridge there is formed a memory insertion hole for receiving a short side and a thickness of a substantially rectangular plate-shaped memory, the memory insertion hole being adapted so that the plate-shaped memory is inserted thereinto with the short side being an insertion side,
      wherein a memory attaching portion of a length substantially in correspondence with a long side of the plate-shaped memory is formed in the cartridge in a manner continuous to the memory insertion hole and in parallel to a side of the cartridge adjacent to the one side where the memory insertion hole is formed, and
      wherein at a terminating portion of the memory attaching portion there are provided a group of terminals for connection to terminals provided on the plate-shaped memory.

14. The memory medium comprising the cartridge and the plate-shaped memory as set forth in claim 13, wherein the rectangular cartridge is adapted so that one side is substantially 89.9 mm, an other side is substantially 93.9 mm, and a thickness is substantially 3.5 mm,
   wherein the plate-shaped memory is adapted so that the short side is substantially 21.45 mm, the long side is substantially 50 mm, and the thickness is substantially 2.8 mm,
   wherein the memory insertion hole is adapted so that a long side is substantially 21.7 mm and a short side is substantially 2.85 mm; and
   wherein the memory attaching portion is adapted so that a depth is substantially 50.0 mm.

15. The memory medium comprising the cartridge and the plate-shaped memory as set forth in claim 14, wherein, at one corner portion of a front face serving as an insertion end of the plate-shaped memory, there is formed an erroneous insertion preventing groove of which a front side and bottom side are opened; and
   wherein, at the terminating portion of the memory attaching portion, there is formed an erroneous insertion preventing projection that engages with the erroneous insertion preventing groove.

16. The memory medium comprising the cartridge and the plate-shaped memory as set forth in claim 14, wherein the thickness of the plate-shaped memory is more than 80% of the thickness of the cartridge.

17. The memory medium comprising the cartridge and the plate-shaped memory as set forth in claim 14, wherein the long side of the plate-shaped memory has a length that is more than half a length of one side of the cartridge.

18. The memory medium comprising the cartridge and the plate-shaped memory as set forth in claim 14, wherein the short side of the plate-shaped memory is 20% to 25% of the other side of the cartridge.

19. The memory medium comprising the cartridge and the plate-shaped memory as set forth in claim 13, wherein the memory insertion hole is provided at one side of the cartridge, and the memory fitting (attaching) portion is formed in parallel to the other side of the cartridge.

20. The memory medium comprising the cartridge and the plate-shaped memory as set forth in claim 19, wherein the plate-shaped memory is inserted into a recording and/or reproducing apparatus from a direction in parallel to the other side of the cartridge.

21. The memory medium comprising the cartridge and the plate-shaped memory as set forth in claim 19, wherein at one corner portion of a front face serving as the insertion end of the plate-shaped memory there is an erroneous insertion preventing groove of which a front side and bottom side are opened; and
   wherein at the terminating portion of a memory attaching portion there is formed an erroneous insertion preventing projection that engages with the erroneous insertion preventing groove.

22. The memory medium comprising the cartridge and the plate-shaped memory as set forth in claim 19, wherein the thickness of the plate-shaped memory is more than 80% of a thickness of the cartridge.

23. The memory medium comprising the cartridge and the plate-shaped memory as set forth in claim 19, wherein the long side of the plate-shaped memory has a length that is more than half a length of the other side of the cartridge.

24. The memory medium comprising the cartridge and the plate-shaped memory as set forth in claim 19, wherein the short side of the plate-shaped memory is 20% to 25% of the other side of the cartridge.

* * * * *